Aug. 2, 1938.  C. STIRN  2,125,741

COOKING UTENSIL

Filed Feb. 21, 1938  2 Sheets-Sheet 1

Inventor:
Charles Stirn
By Freeman, Sweet, Albrecht & Weidman
Attys.

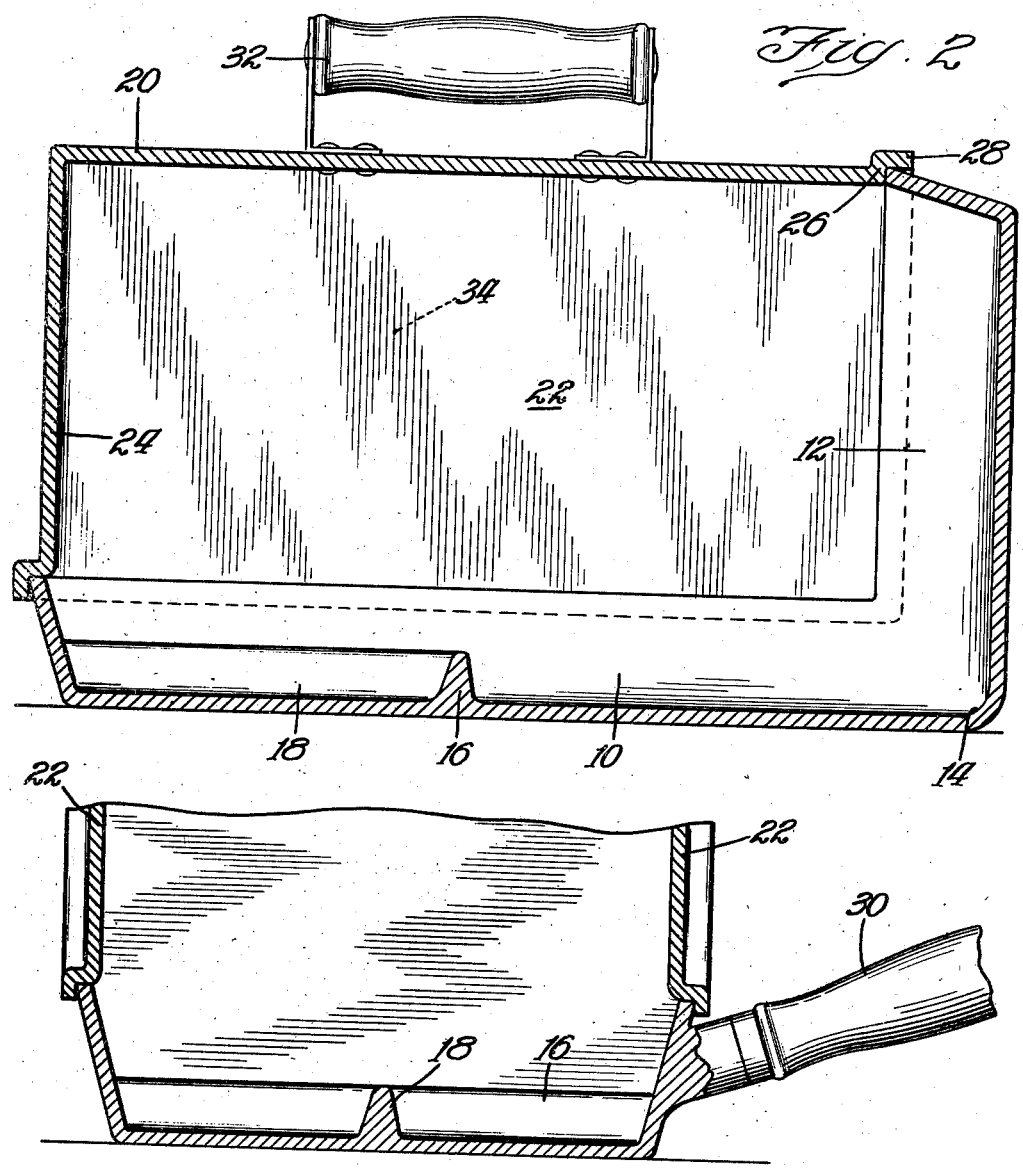

Patented Aug. 2, 1938

2,125,741

UNITED STATES PATENT OFFICE 2,125,741

COOKING UTENSIL

Charles Stirn, Chicago, Ill.

Application February 21, 1938, Serial No. 191,587

6 Claims. (Cl. 53—7)

My invention relates to cooking and includes among its objects and advantages an increase in the quickness with which a variety of cooking operations can be performed with a single cooking utensil.

In the accompanying drawings:

Figure 2 is a section on line 2—2 of Figure 1;

Figure 3 is a section on line 3—3 of Figure 1; and

Figure 1:
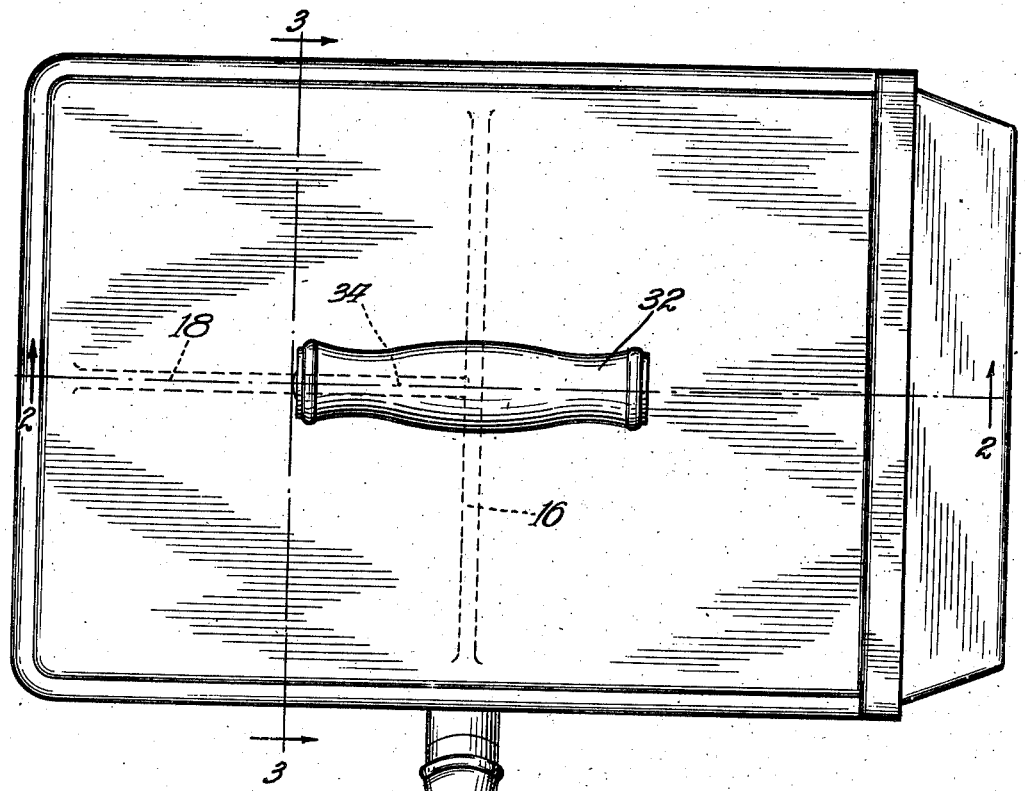
Figure 1 is a plan view of a combined frying pan and stewing dish according to the invention.

In the embodiment of the invention selected for illustration the cooking utensil proper is of angle shape and comprises a long leg 10 and a short leg 12. Each leg comprises a flat bottom bordered on three sides by a rim extending up at the usual angle of about 75° to the horizontal. As most clearly indicated in Figure 2, the bottoms of the legs 10 and 12 join in a di-hedral angle at 14 so that each bottom portion functions as a rim for the other, when cooking is going on in either portion. At this point of junction the walls are curved to merge into each other as clearly indicated in the drawings.

I have also indicated a transverse rib 16 projecting up from the bottom of the long leg 10 and a longitudinal rib 18 extending from the rib 16 to the end of the long leg. The distance between the transverse rib 16 and the dihedral angle at 14 is substantially identical with the longitudinal extent of the short leg 12.

Figure 4:
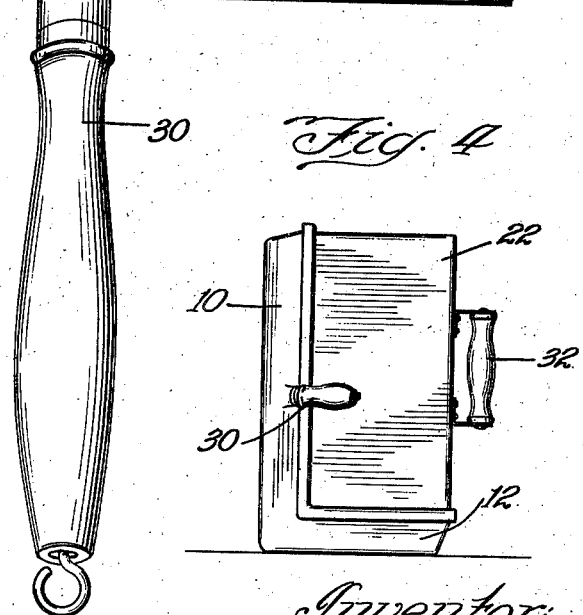
Figure 4 is a side elevation on a reduced scale of the same device arranged for cooking on its smaller cooking surface.

Functioning without the cover, it will be apparent that such a cooking utensil could be positioned as in Figure 4 to cook a pancake on one side in the short leg 12. When the cooking of one side of the pancake is completed, it may be loosened and the entire utensil may be flopped over into the position of Figures 1 and 2, which will throw the pancake into the proximate portion of the long leg 10 with the other or uncooked side exposed to the cooking action. And while this second side of the pancake is cooking, the operator can drop a slice or two of bacon into one of the end apartments defined by the partitions 16 and 18, and break an egg into the other or brown a few slices of potato. Thus, at the precise moment that the pancake is freshly cooked and piping hot, the contents of the two end compartments can be dished up in an equally freshly cooked condition.

As another instance, in making a Spanish omelet, the cooking may be done with the utensil in the positions of Figures 1 and 2 with meat and sliced onions in the small compartments. When these are about half cooked the egg ingredient is deposited in the other portion of the long leg 10. Then when the meat and onions are properly cooked they can be shoveled over the partition 16 and folded into the partly cooked egg portion, either with or without turning the utensil to the position of Figure 4 to throw the whole mixture into the smaller area of the short leg.

The foregoing are only illustrative instances of the many uses to which such a device may be put.

The cover illustrated comprises a top wall 20, downwardly depending side walls 22 and a downwardly extending end wall 24. The ends of the walls 20 and 22 adjacent the short leg are offset as at 26 and continued a short distance as at 28 to define a shoulder to abut the adjacent rim of the short leg. And the lower edges of the walls 22 and 24 are identically fashioned for similar abutment with the adjacent edges of the rim of the long leg 10. It will be apparent that in the position of Figure 1 and also in the position of Figure 4, the center of gravity of the pan without the cover is spaced well away from the angle 14 so that the device will stand steady in either position. Similarly, the center of gravity of the cover is such that it will rest firmly on the pan portion in either position. And the center of gravity of the complete combined unit gives the complete combined unit slightly greater stability than the pan portion has without the cover.

I have illustrated a stud handle 30 for the pan portion located substantially midway between the ends of the long leg 10 and, when the device is in the position of Figure 1, sloping up at the usual convenient angle. The bail handle 32 for the cover is preferably positioned where its ends extend on opposite sides of the center of gravity of the cover. On account of the weight of the wall 24 the center of gravity of the cover will occupy a position indicated approximately at 34 in Figures 1 and 2. By locating the handle 32 a little farther from the wall 24, there is a slight tendency for the cover, when supported by the handle, to have the flanged end of the wall 20 a little higher than the remote end so that the operator will naturally set the end of the wall 24 in place first. However, this tendency is so slight that an operator who prefers to engage the parts at the opposite corner first will have no difficulty in so doing.

The stud handle 30 in the position of Figures 1, 2, and 3 is substantially in the vertical plane of the center of gravity of the combined pan and cover. When the cover is in place, the operator will ordinarily grasp both handles 30 and 32 when turning the device up to the position of Figure 4. Working without the cover, the center of gravity of the pan is slightly to the right of the handle, as seen in Figure 1, so that the pan tends to turn over to the position of Figure 4 when the operator starts to lift it. However, this tendency is slight enough to be resisted easily by a gentle grip on the handle 30, in case the operator desires to lift the pan without turning it on end.

While the center of gravity of the assembled pan and cover is not the same as the center of gravity of the pan alone, in either instance the center of gravity will be vertically above and well within the contour of the short leg 12, as viewed in Figure 4. Also, if the device is resting on the long leg 10, the center of gravity will in either instance be vertically above and well within the contour of the long leg 10. In other words, the space defined by projecting the area of either leg in a direction perpendicular to the plane of that leg always encloses the center of gravity. The geometrical location of the center of gravity is therefore correctly defined as being within the geometrical projections of both legs.

Without further elaboration the foregoing will so fully explain my invention that others may, by applying knowledge current at the time of application, readily adapt the same for use under various conditions of service.

I claim:

1. A cooking utensil of the frying pan type, comprising: two adjacent bottom elements joined at a dihedral angle along one side of the periphery of each element; rim flanges around the remainder of the periphery of each bottom element; one of said elements being longer than the other; a handle projecting from said long element; the center of gravity of said utensil lying within the geometrical projection of both bottom elements; said handle lying slightly offset from the center of gravity of the utensil in a direction away from the short bottom element.

2. A cooking utensil of the frying pan type, comprising: two adjacent bottom elements joined at a dihedral angle along one side of the periphery of each element; rim flanges around the remainder of the periphery of each bottom element; a handle projecting from one of said elements; a cover shaped and proportioned to rest in abutment with the edges of the rim flanges and define an enclosure; the center of gravity of said utensil lying within the geometrical projection of both bottom elements; the center of gravity of said cover when in place also lying within the geometrical projection of both bottom elements.

3. A cooking utensil of the frying pan type, comprising: two adjacent bottom elements joined at a dihedral angle of substantially ninety degrees along one side of the periphery of each element; the center of gravity of said utensil lying within the geometrical projection of both bottom elements.

4. A cooking utensil of the frying pan type, comprising: two adjacent rectangular bottom elements joined at a dihedral angle of substantially ninety degrees along one side of the periphery of each element; one of said elements being longer than the other; a handle projecting from said long element; the center of gravity of said utensil lying within the geometrical projection of both bottom elements.

5. A cooking utensil of the frying pan type, comprising: two adjacent rectangular bottom elements joined at a dihedral angle of substantially ninety degrees along one side of the periphery of each element; upwardly and outwardly extending rim flanges around the remainder of the periphery of each bottom element; one of said elements being longer than the other; said shorter bottom element having a flat upper surface; said longer bottom element having a flat upper surface adjacent said shorter element, and a transverse rib projecting upwardly to define the outer limit of a flat upper surface portion equal in extent and contour to the shorter bottom element; a handle projecting from said longer element; the center of gravity of said utensil lying within the geometrical projection of both bottom elements, and not farther from said short element than said handle.

6. A cooking utensil according to claim 4 having a rib structure subdividing an area of one of said bottom elements.

CHARLES STIRN.